United States Patent [19]

Olson

[11] 4,324,143
[45] Apr. 13, 1982

[54] SINGLE PATH ADJUSTABLE FLOWMETER

[75] Inventor: Jerry A. Olson, Dearborn, Mich.

[73] Assignee: Eaton Corporation, Cleveland, Ohio

[21] Appl. No.: 187,294

[22] Filed: Sep. 15, 1980

[51] Int. Cl.³ ............................ G01F 1/50; G01F 1/32
[52] U.S. Cl. ............................... 73/861.62; 73/861.64
[58] Field of Search ............... 73/202, 861.32, 861.34, 73/861.42, 861.52, 861.63–861.66, 861.62

[56] References Cited

U.S. PATENT DOCUMENTS

| | | | |
|---|---|---|---|
| 2,614,747 | 10/1952 | Christensen | 138/37 X |
| 3,086,395 | 4/1963 | York | |
| 3,889,536 | 6/1975 | Sylvester | |
| 4,056,977 | 11/1977 | Gau | 73/861.34 X |
| 4,074,571 | 2/1978 | Burgess | |
| 4,136,565 | 1/1979 | Migrin et al. | 73/861.62 |
| 4,164,144 | 8/1979 | Kaiser et al. | 73/861.64 |
| 4,232,549 | 11/1980 | Migrin et al. | 73/202 |
| 4,282,751 | 8/1981 | Brown et al. | 73/202 |

FOREIGN PATENT DOCUMENTS

| | | | |
|---|---|---|---|
| 171129 | 9/1965 | U.S.S.R. | |
| 437846 | 1/1975 | U.S.S.R. | 73/861.32 |

Primary Examiner—Charles A. Ruehl
Attorney, Agent, or Firm—C. H. Grace; J. G. Lewis

[57] ABSTRACT

A low pressure drop air flowmeter (10) for an automotive engine is disclosed. The meter includes a main air flow passage (26), a relatively small venturi tube (28) receiving a portion of the air flow, a pressure port (74) for sensing stagnation pressure in the main passage, a pressure port (70) for sensing static pressure in the throat of the venturi, and a complimentary pair of sets of stationary swirl vanes (30 & 32) disposed adjacent the outlet of the venturi and operative to jointly impart a swirl through the remainder of the air in the main passage, thereby creating a reduced pressure at the venturi outlet for amplifying the pressure difference between the stagnation and static pressures without appreciably increasing the pressure drop across the flowmeter. The sets of swirl vanes are rotationally displaceable with respect to one another, allowing some of the air to bypass the effect of the swirl vanes without being diverted to a separate passageway. This arrangement results in a fluid flowmeter having a characteristic pressure drop which is less than that for a conventional device, particularly at high flow rates, and which can be easily reconfigured to suit a specific application. Also disclosed is a solenoid valve (54) operative to selectively sample stagnation pressure in the main flow passage and signal pressure in the throat of the venturi and generate an electrical output signal as a function of the difference between these two pressure signals.

29 Claims, 5 Drawing Figures

SINGLE PATH ADJUSTABLE FLOWMETER

FIELD OF THE INVENTION

This invention relates to fluid flowmeters in general and particularly to such flowmeters designed specifically for use in automotive internal combustion engines.

CROSS-REFERENCE

The invention described in the present application represents an improvement of that described in U.S. Ser. No. 845,751 filed Oct. 26, 1977, now U.S. Pat. No. 4,164,144 issued Aug. 14, 1979 and is related to the invention described in U.S. Ser. No. 898,267 filed Apr. 20, 1977, now U.S. Pat. No. 4,136,565 issued Jan. 30, 1979; U.S. Ser. No. 966,844 filed Dec. 6, 1978, now U.S. Pat. No. 4,232,549 issued Nov. 11, 1980 and; U.S. Ser. No. 070,593 filed Aug. 29, 1979, now U.S. Pat. No. 4,282,751 issued Aug. 11, 1981.

BACKGROUND OF THE INVENTION

Fluid flowmeters of the pressure drop or differential type are well known. Orifice plate and venturi flowmeters are probably the most common of the pressure drop type. Orifice plate flowmeters are inexpensive, but they are inherently high energy loss devices since the measured pressure drop across the orifice is non-recoverable, i.e. the drop in pressure is a drop in total pressure. Venturi flowmeters are low energy loss devices relative to orifice plate flowmeters since most of the pressure drop in the venturi throat is recoverable at the venturi outlet, i.e., the drop in pressure in the throat is due to an increase in kinetic energy of the fluid. However, when either of these flowmeters are used to measure fluid flow which varies over a wide range, such as air flow to an automotive engine, they either overly restrict total airflow at high engine speeds and loads if they are sized small enough to provide an adequate differential signal at low engine speeds and loads, or they provide an inadequate differential pressure signal at low engine speeds and loads if they are sized larger.

One prior art patent proposed a fluid flowmeter having a main air passage and a relatively small venturi tube in the main air passage receiving a portion of the total air flow and providing a static pressure signal for determining volumetric air flow in conjunction with a stagnation pressure signal in the main passage. This same patent also proposed placing a restriction in the main passage between the venturi tube inlet and outlet to increase the pressure difference across the venturi and thereby increase the pressure difference between the static and stagnation pressure. However, the restriction has the disadvantage of increasing the total pressure drop across the flowmeter, thereby increasing energy loses and decreasing the operating range of the flowmeter.

An additional shortcoming of many prior art devices resides in the fact that they are dedicated to a particular application and cannot be easily adjusted or reconfigured to accommodate differing applications or operational variations in a given application from system to system. For example, many flowmeters intended for automotive application are designed for an engine of known displacement and idealized respiration characteristics. Such flowmeters are often unsuitable for engines of slightly differing displacement or engines of the same displacement which fall in the outer fringe of design tolerances.

One prior art approach to affectively increase the operating range of a flowmeter while maintaining an acceptable pressure signal level is the bypass, which operates to shunt some of the fluid flowing through the meter around the swirl vanes, orifice, venturi tube or other signal generating element therein. Although such devices extend the range of operation, they have two major shortcomings. First, an inherent error factor is invited when the totality of air flow is not measured inasmuch as the ratio of measured air flow to bypassed air flow may vary. Additionally, such devices add mechanical complexity with its incumbent cost, reduced response (due to the mass of the moving parts) and shortened lifetime (due to the exposure of the interface between moving and nonmoving parts to moisture and contaminents within the air flow).

BRIEF DESCRIPTION OF THE INVENTION

The present invention overcomes the above described shortcomings by providing a fluid flowmeter which sufficiently restricts air flow at relatively low flow rates to generate a useable pressure differential signal and reduces that restriction at higher flow rates to minimize overall pressure drop while maintaining a single air flow path of relatively simple design. This is accomplished by an improved flowmeter of the type including a set of swirl vanes for swirling fluid in a passage to create a low pressure region at the center of the swirl, and means for sensing the signal pressure at the center of the swirl and the stagnation pressure upstream of the swirl, the improvement comprising a second set of swirl vanes which coact with the first set to form the swirl and which can be selectively repositioned with respect to the first set to effect a desired set (differential pressure to flow rate and meter pressure drop to flow rate) of operating characteristics. This arrangement provides the advantage of a simple single path flow meter which is readily adjustable to tailor a given flowmeter to a specific application.

According to another aspect of the invention, the sets of swirl vanes are mutually complimentary. This arrangement has the advantage of enabling the two sets of swirl vanes to coact as a single set when aligned in phase with one another.

According to another aspect of the invention, a set of radially extending straightening vanes for removing pre-swirl from the fluid is disposed in the passage upstream of the sets of swirl vanes. This arrangement has the advantage of inhancing the predictability of response and thus the accuracy of the flowmeter.

According to another aspect of the invention, a secondary passage such as a venturi is included within the main passage and extends substantially parallel to the direction of flow, the secondary passage including a converging inlet for receiving a portion of the fluid flowing in the main passage and an outlet for discharging that portion back into the main passage downstream of the inlet. The set of swirl vanes are disposed adjacent the outlet of the venturi. This arrangement provides the advantage of multiple sets of swirl vanes which are displaceable with respect to one another, which, in all relative positions, maintain a low pressure region at the exit of the secondary passage.

According still another aspect of the invention, a body defining the main passage of the flowmeter is divided into two concentric cylindrical members which are rotatably interfaced by respective complimentary surfaces which, in turn, operate to prevent axial misalignment between the members while allowing selective rotational repositioning therebetween. The first set of swirl vanes is secured for rotation to one of the members and the second set of swirl vanes is secured for rotation with the other of the members. This arrangement has the advantage of allowing rotational repositioning of the two sets of swirl vanes by external repositioning of one of the two body members. This can be accomplished with the flowmeter in its installed condition even during operation of the associated engine, without the need for gaining access to the interior thereof.

These and other features and advantages of this invention will become apparent upon reading the following specification, which, along with the patent drawings, describes and discloses a preferred illustrative embodiment of the invention in detail.

The detailed description of the specific embodiment makes reference to the accompanying drawings.

DETAILED DESCRIPTION OF THE SPECIFIC EMBODIMENT

Figures 1, 2, 3:
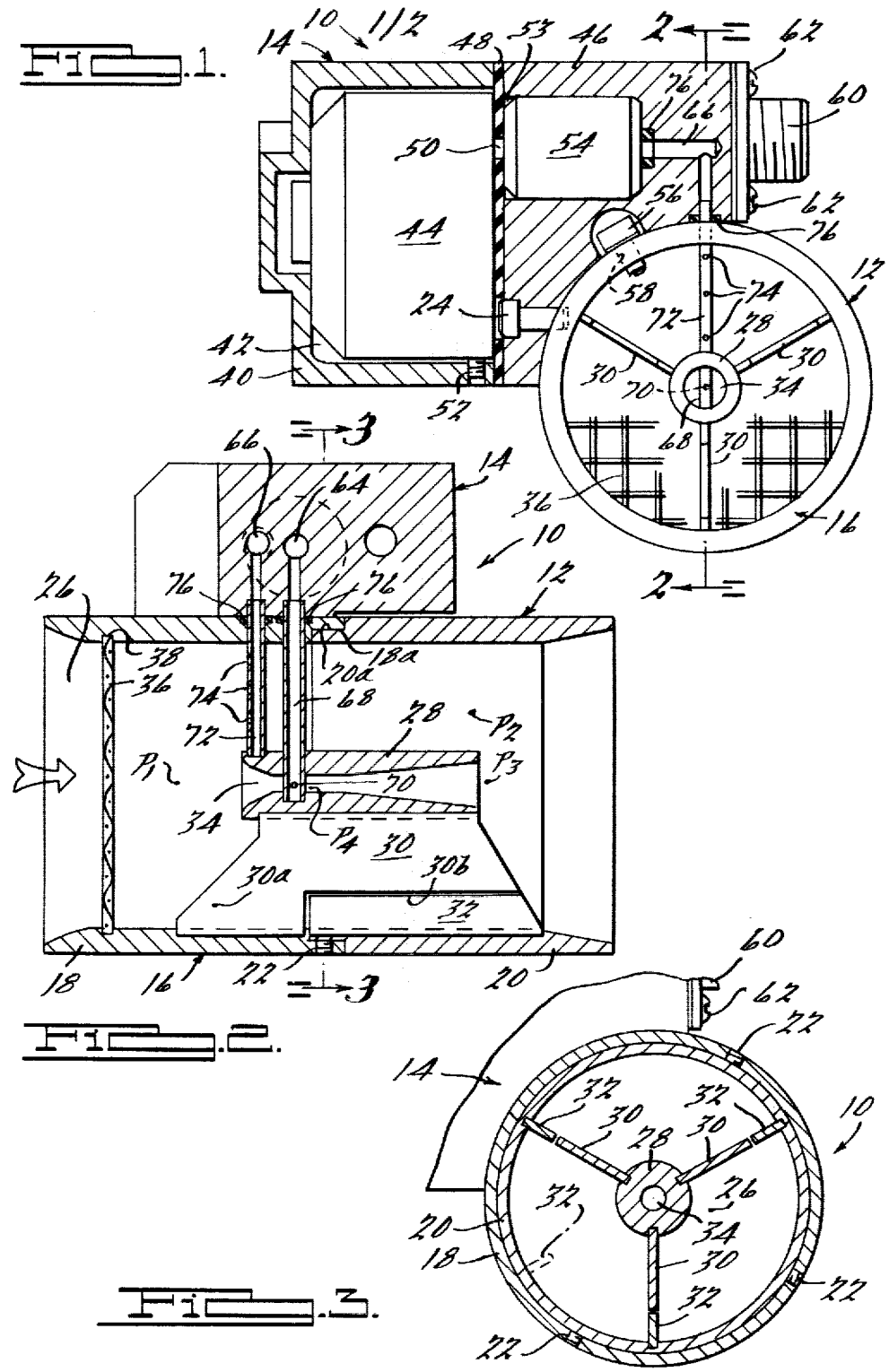
FIG. 1, is a top plan view of the preferred embodiment of the fluid flowmeter with its valve section broken away to illustrate the internal details thereof.
FIG. 2, is a cross-sectional view taken on line 2—2 of FIG. 1.
FIG. 3, is a fragmentary cross-sectional view taken on line 3—3 of FIG. 2.

The preferred embodiment of the invention is illustrated in FIGS. 1, 2 and 3. A flowmeter assembly 10 comprises a flowmeter section 12 and a valve section 14. Flowmeter assembly 10, as disclosed, is adapted for measuring the mass air flow to an internal combustion engine. However, flowmeter section 12, with or without valve section 14, may be used in other environments as a mass flowmeter or a volumetric flowmeter. With the exceptions that will denoted herein, the present invention operates substantially as described in U.S. Pat. No. 4,164,144 and represents an improvement thereof. Accordingly, the specification of U.S. Pat. No. 4,164,144 as well as related U.S. Pat. Nos. 4,136,565, 4,232,549 and 4,282,751 are incorporated herein by reference.

Flowmeter section 12 comprises a tubular outer housing or body 16 which is open at both ends for inclusion in air intake ducting system of an automobile internal combustion engine. As illustrated, air flowing through flowmeter assembly 10 will pass from left to right in FIG. 2. Body 16 comprises first and second cylindrical body members 18 and 20 respectively. Body member 18 has an inner counter bore 18a at the right hand most extent thereof as viewed in FIG. 2. Body member 20 has a complimentary outer counter bore 20a on the left hand extent thereof which cooperates with counter bore 18a to form a rotating interface between body members 18 and 20 whereby they are free to rotate with respect to one another unless otherwise constrained but are retained in axial alignment with one another. Several set screws 22 pass radially inwardly through the wall portion of body member 18 adjacent counter bore 18a at circumferentially spaced points thereabout. In application, set screws 22 are tightened to bear against the outer surface of the wall of body member 20 adjacent counter bore 20a to restrain member 20 from rotational displacement with respect to body member 18. Valve section 14 is mounted on the outward most circumferential wall of body member 18 by screws 24 (see FIG. 1) or other suitable fastening means.

Body 16 defines the main air flow passage 26 within which is disposed a venturi 28 and a set of swirl vanes 30 which extend radially from the outer surface of venturi 28 to the inner surface of body member 18. Swirl vanes 30 are circumferentially evenly spaced about main air flow passage 26 and support venturi 28 in the position illustrated. The upstream most ends of swirl vanes 30 (lefthand most extent as viewed in FIG. 2) are oriented to be parallel to the direction of air flow as it enters flowmeter assembly 10 and thus constitutes straightening vanes 30a which are integrally formed with the remainder of swirl vanes 30. The downstream portion of vanes 30 adjacent body member 20 has a relief 30b formed therein along the radially outward most extent thereof. A second set of swirl vanes 32 depend radially inwardly from the inner wall of body member 20 and are shaped complimentarily with relief 30b. Although each set of swirl vanes 30 and 32 are illustrated as being composed of three individual vanes, it is contemplated that more or fewer could be employed, depending upon the application contemplated without departing from the spirit of the present invention.

Figure 4:
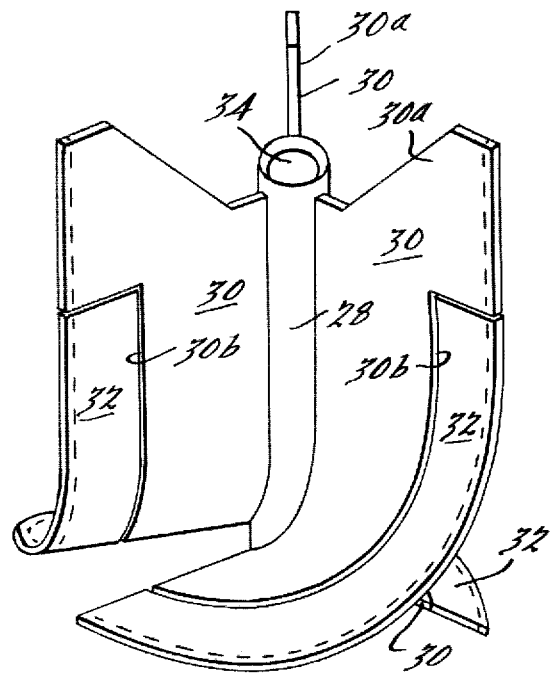
FIG. 4, is a perspective view of the swirl vane-venturi assembly employed within the flowmeter of FIG. 1.

The optimum shape of swirl vanes 30 and 32 is empirically derived and depends upon the nature of the fluid being monitored as well as the range of flow rates contemplated. The arrangement found by the applicant to be particularly effective for a small V-8 engine defines a complex plane as is illustrated in perspective in FIG. 4 removed from body 16. Individual vanes 30 and 32 are formed as compliments to one another to collectively fill the entire radial extent from the outer surface of venturi 28 to the inner surface of body 16. The vane shown in FIG. 2 is illustrated as being straightened only to demonstrate the method of attachment of vanes 30 and 32 to body 16 and venturi 28. The shape of the swirl vanes 30 and 32 employed by the applicant in his preferred embodiment is that illustrated in FIG. 4. The radially outermost extent of vanes 30 and 32 are imbedded in the inner surfaces of body members 18 and 20 respectively to the extent illustrated by the dotted lines in vanes 30 and 32 in FIG. 4. In such an arrangement, it is contemplated that appropriate mating slots be formed in the outer surface of venturi 28 as well as the inner surfaces of body members 18 and 20 to receive swirl vanes 30 and 32, which can be press fitted therein, welded or otherwise suitably affixed for permanent retention. Additionally, it is contemplated that the entire flowmeter section 12 can be intregally molded in two pieces, one comprising body member 18, swirl vanes 30 and venturi 28, and the other comprising body member 20 and swirl vanes 32.

Swirl vanes 30 and 32 are illustrated in their aligned orientation in which the planes defined thereby substantially coincide. Swirl vanes 30 and 32 should be manufactured under relatively tight tolerances so the gap therebetween is relatively small and will have an inconsequencial effect upon the dynamics of the air flowing thereby. The pitch and the complex planes formed by vanes 30 and 32 are substantially the same in the preferred embodiment of the invention whereby when vanes 30 and 32 are aligned, they coact to effect the swirl in the same way as the unified vanes do as described in U.S. Pat. No. 4,164,144. However, empirical study, has demonstrated that, in some applications, a slight relative variation in pitch and shape of vanes 30 and 32 can effect a minimization of total pressure drop across flowmeter assembly 10 without appreciably lowering signal pressure. Specifically, repositioning vanes 32 to assume a pitch slightly greater than that of vanes 30 has been found to provide improved performance under some circumstances. Accordingly, in its broadest sense, the present invention is not to be limited to swirl vanes of any specific number, pitch or shape.

When set screws 22 are loosened, body member 20 and swirl vanes 32 can be rotationally repositioned with respect to the remainder of flowmeter assembly 10 as indicated in FIG. 3. By virtue of there being three vanes in each set 30 and 32, each vane is angularly displaced from the other two vanes in its set by 120 degrees. Thus, if body member 20 is angularly repositioned by 120 degrees, swirl vanes 30 and 32 will again be in the aligned condition. Maximum misalignment therefore will occur when swirl vanes 30 and 32 are misoriented by 60 degrees as illustrated in FIG. 3. Definitionally, this condition is the opposed condition for the purposes of the specification.

The passageway through venturi 28 is defined as the secondary air flow passage 34 which will operate to intercept a portion of the air or fluid flowing through flowmeter assembly 10 and reintroduce it back into the main air flow passage 26 downstream therefrom. Venturi 28 may be replaced by a straight walled tube or a substantially straight walled tube. However, the venturi tube has been found to provide a lower static pressure, particularly when the total air flow through the flowmeter is low, and therefore a greater differential pressure signal. A wire mesh 36 is disposed at the upstream opening of flowmeter assembly 10 to prevent foreign objects from entering main air flow passage 26. Mesh 36 is retained within a circumferential groove 38 formed in the inner surface of body member 18 near the left hand most extend thereof as viewed in FIG. 2.

Valve section 14 comprises an aluminium housing 40 which is mounted to the outside surface of body member 18 of flowmeter section 12. It is contemplated that housing 40 could be integrally molded with body member 18. Housing 40 contains a first cavity 42 which receives a pressure transducer 44. Housing 40 is affixed to a second housing 46 such as by screws (not illustrated) through an intermediate gasket 48 which effectively seals cavity 42 with the exception of a port 50 formed in gasket 48. A set screw 52 passes inwardly through a wall of housing 40 to abutt the outer surface of pressure transducer 44 and retain it in the illustrated position. Housing 46 has a cavity 53 defined thereby which nestingly receives a solenoid 54 therein. Pressure transducer 44 may be of any several well known types. Herein, transducer 44 is an absolute pressure transducer of the type described in the Society of Automotive Engineers (SAE) Paper 70397 and manufactured by the instruments division of Bunker Ramo Corporation. Transducer 44 measures the absolute stagnation and static pressure within flowmeter assembly 10 and produces electrical output signals representative of each pressure. These signals may be processed by an electronic logic system to produce a signal representative of the volumetric air flow through the flowmeter or, since the stagnation pressure is compared with absolute pressure, the signals may be processed with an absolute air temperature signal provided by a temperature sensor 56 in main passage 26 to produce a signal representative of mass air flow through flowmeter assembly 10. Temperature sensor 56 passes through a receiving aperature 58 in body member 18. Electrical leads (not illustrated) are routed through channels in housings 40 and 46 to an electrical connector 60. Electrical connector 60 is affixed to housing 46 by screws 62 and is adapted to electrically interconnect flowmeter assembly 10 with an electronic logic system.

Because the internal details of solenoid 54 have been described throughly in the U.S. Pat. Nos. 4,164,144 and 4,136,565, such description will not be repeated here for the sake of brevity. Solenoid 54 is basically a three port device having two inlet ports and an outlet port which is internally selectively interconnected to one or the other of the inlet ports for fluid communication therebetween by means of an electro-magnetic actuator. The actuator is powered by an external source (not illustrated) which would be part of the control circuit connected by electrical wires via connector 60. The outlet port of solenoid 54 is in register with port 50 of gasket 48 and thereby is in direct fluid communication with the pressure sensor of transducer 44. Gasket 48 also closes cavity 53. The inlet ports of solenoid 54 emerge from the solenoid at the end opposite that of its outlet port into registering passageways 64 and 66 formed within housing 46. Passageway 64 opens into a static pressure sensing tube 68 which passes radially inwardly, through the wall of body member 18 and the wall of venturi 28 and terminates at a point partially through the opposite wall of venturi 28 within the throat thereof. A pair of laterally opening static pressure sensing ports 70 are formed in tube 68 within the throat of venturi 28. Passageway 66 likewise opens into a stagnation pressure sensing tube 72 which is directed radially inwardly, passing through the wall of body member 18 and terminating in the closest wall of venturi 28. Three stagnation pressure sensing ports 74 are radially spaced along tube 72, opening in the upstream direction. The radially innermost ends of tubes 68 and 72 are closed at their point of imbeddment within venturi 28. O-rings 76 are provided for sealing at the point of interconnection of passageways 64 and 66 and tubes 68 and 72, respectively, as well as passageways 64 and 66 and the inlet ports of solenoid 54. Tubes 68 and 72 are preferrably formed of copper, brass or the like. However, it is contemplated that other suitable material could be employed. Additionally, it is contemplated that the passageways formed by tubes 68 and 72 could be provided integrally within flowmeter assembly 10 as would be obvious to one skilled in the art. Additionally, stagnation pressure sensing tube 72 is disposed adjacent the inlet of venturi 28, but it is contemplated that it may be selectively positioned elsewhere upstream of flowmeter assembly 10.

By alternately energizing and deenergizing solenoid 54, transducer 44 alternately samples the signal pressure within the throat of venturi 28 and the stagnation pressure within main passageway 26 of the fluid flowing through flowmeter assembly 10. With the solenoid in one position, the pressure sensing port of transducer 44 senses static pressure through port 50, the outlet port of solenoid 54, the inlet port of solenoid 54 associated with passageway 64, tube 68 and finally ports 70. When solenoid 54 is in its other position, its inlet port associated with passageway 64 is closed and its outlet port is connected to the inlet port associated with passageway 66. At this time, transducer 44 will be sensing stagnation pressure through port 50, the outlet port of solenoid 54, the inlet port of solenoid 54 associated with passageway 66, tube 72 and sensing ports 74. By alternately energizing and deenergizing the coil of solenoid 54, the electrical output at connector 60 from pressure transducer 44 will alternately represent the absolute stagnation pressure of the air flowing through flowmeter assembly 10 and the absolute static pressure of the air measured in the throat of venturi 28, depending upon the position of solenoid 54. These two signals can be processed to produce an electrical signal proportioned to the difference between the two pressures. This technique is commonly referred to as "auto-referencing" which is used in obtaining accurate differencial measurements.

Operation of flowmeter section 12 is as follows: air enters the inlet of main passage 26 with a given axial or transport velocity. The stagnation pressure $P_1$ (refer to FIG. 2) of the entering air is sensed by stagnation ports 74, these ports or a single port may be disposed further upstream or external of the main passage. A portion of the air flows through the inlet of venturi 28 and the remainder of the air flows through straightening vanes 30a to remove substantially all pre-swirl of the air due to upstream conditions. When the air leaves the straightening vanes, it has a substantially uniform and homogeneous axial flow pattern parallel to the central axis as it enters the swirl vanes 30 and 32. The swirl vanes impart a tangential swirl velocity vector to the air. The axial and tangential velocity vector components of the swirl velocity form an air flow pattern (known as forced-vortex flow) similar to a tornado which has a high velocity at its central axis and a diminishing velocity radially outward from the central axis. This resulting radial velocity gradient forms an associated radial pressure gradient having a static pressure $P_2$ at the radius of mean mass flow of air through the main passage and a low static pressure region $P_3$ at the central axis. This low pressure accelerates the air leaving the outlet of the venturi and therefore amplifies the velocity of the air flowing through the venturi. As a result, the static pressure $P_4$ of the air in the venturi throat is proportionally decreased. The total volumetric or mass air flow through the flowmeter may then be calculated in a known manner by known fluid flow principles in conjunction with the expression $P_1 - P_4 = K (P_1 - P_2)$, wherein K is a proportionality constant. K may be empirically derived.

The static pressure $P_4$ in the venturi throat is directly related to the total air flow through the meter since the amount of air flowing through the venturi is directly related to the low static pressure $P_3$ produced by the swirl vanes 30 and 32. Hence, the disclosed flowmeter does not depend upon or use localized air flow techniques to measure air flow, which localized air flow in some modes of operation may be far from representative of total air flow through the meter.

Figure 5:
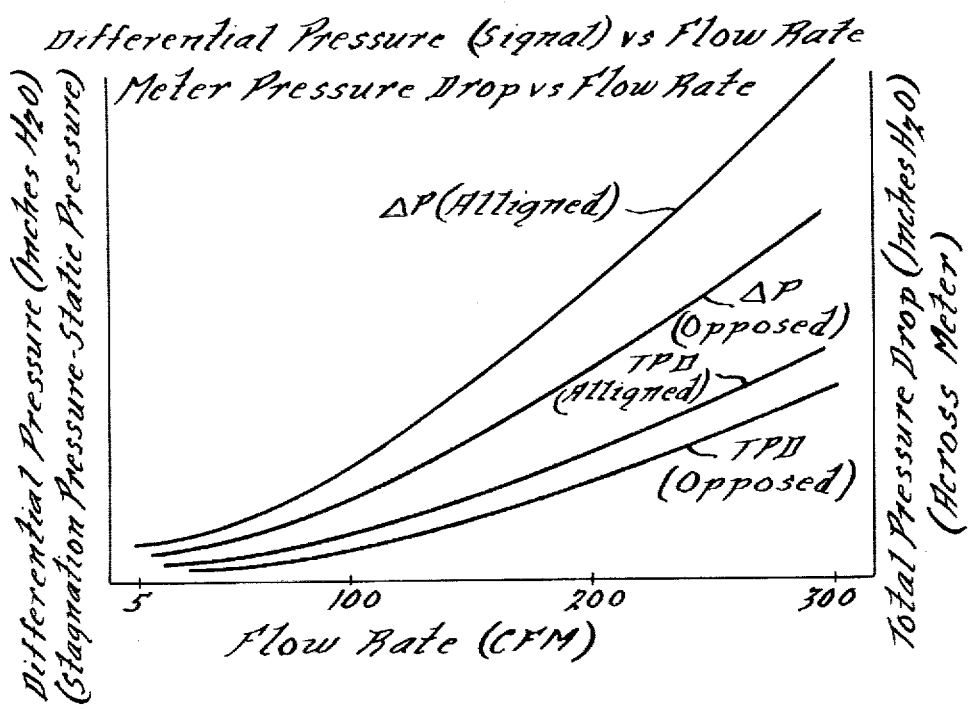
FIG. 5, is a pressure differential and total pressure drop response graph illustrating the change in operating characteristics effected by relative repositioning of the swirl vanes within the flowmeter of FIG. 1.

The advantages of operation of the flowmeter assembly 10 can best be appreciated by referring to FIGS. 3 and 5. Relative repositioning of vanes 30 and 32 operates to effect specifically desired differential pressure signal to flow rate and meter pressure drop to flow rate operating characteristics for the meter through the use of a single main flow path without the need of a bypass or other range extending mechanism. This results in a compact unit that is readily adjustable in application by the process set forth hereinabove. When the sets of swirl vanes 30 and 32 are positioned as shown in solid line in FIG. 3, flowmeter assembly 10 operates substantially as the device described in U.S. Pat. No. 4,164,144, having differential pressure and meter total pressure drop operating characteristics as illustrated in FIG. 5 designated "aligned". However, the applicant has found that, with improved pressure transducers and more sensitive electronic control circuits, a tradeoff of signal level for a reduced total pressure drop is desirable. Under such circumstances, the present invention becomes particularly attractive inasmuch as a common design can be employed in multitudinous applications wherein differing operating characteristics are considered optimum. For example, it is contemplated that a single design flowmeter assembly could be applied to a family of of internal combustion engines, and once installed, calibrated through the repositioning of vanes 30 and 32 to achieve a specified maximum total pressure drop at the upper range of flow rate. Likewise, the present invention can compensate for variations between individual internal combustion engines of given design whereby the flowmeter assembly associated with a given engine can be calibrated to optimumally suit that particular engine.

FIG. 5 demonstrates a range of characteristics achieveable from a given configuration and is intended for purposes of illustration only. Differential pressure and total pressure drop (TPD) are given to illustrate the effect that repositioning of vanes 30 and 32 has upon the meter's operating characteristics. One end of the range is defined when vanes 30 and 32 are aligned as shown in solid line in FIG. 3. The other extreme is shown with swirl vane 32 in phantom rotated 60 degrees from its solid line position to assume an "opposed" position with respect to swirl vanes 30. As will be obvious to one of ordinary skill in the art, an infinite set of intermediate characteristics can be achieved by repositioning the vanes between the aligned and the opposed positions.

When vanes 30 and 32 are not in the aligned positioned, relief 30b in swirl vanes 30 are no longer occupied by complementary swirl vanes 32 and thus air flowing through flowmeter assembly 10 can spill radially outwardly of swirl vane 30 and not have a substantial tangencial velocity vector imparted thereto. As a result, as vanes 30 and 32 become more and more opposed, a high percentage of air flowing through flowmeter assembly 10 passes through substantially uneffected by the swirl vanes. The portion uneffected by swirl vanes 30 and 32 will be at the radially outwardmost portion of main air flow passage 26, the air passing through radially inward thereof will continue to be effected by swirl vanes 30. By selectively permitting a portion of the radially outwardmost air to pass through main air flow passage 26 without having a swirl imparted thereto, the present inventive flowmeter assembly 10 assumes the advantages of bypass type flowmeters while retaining a relatively simple single passage configuration.

It is to be understood that the invention has been described with reference to a specific embodiment which provides the features and advantages previously described, and that such specific embodiment is susceptable of modification as will be apparent to those skilled in the art. For example, the dimensions, relative sizing of the main and secondary air flow passages as well as the number and shape of swirl vanes 30 and 32 themselves can be altered in numerous ways to accommodate a specific application without departing from the spirit of the present invention. Additionally, it is contemplated that more than two sets of swirl vanes could be incorporated which could be independently repositionable to accommodating more carefully tailored operating characteristics. Accordingly, the foregoing description is not to be construed in a limiting sense.

What is claimed is:

1. In a flowmeter of the type including a first set of swirl vanes for swirling a fluid in a passage to create a low pressure region at the center of said swirl, means for sensing said low pressure, and means for sensing the pressure of said fluid before said swirling, an improvement comprising:
a second set of swirl vanes coacting with said first set to form said swirl and operable for selective repositioning with respect to said first set to effect a desired pressure to flow rate operating characteristic for said flowmeter.

2. The flowmeter of claim 1, wherein individual vanes of said first set of swirl vanes are substantially identical and have surfaces defining complex planes.

3. The flowmeter of claim 2, wherein individual vanes of said second set of swirl vanes are substantially identical and have surfaces defining complex planes.

4. The flowmeter of claim 3, wherein the axial pitch of said first and set of swirl vanes substantially equals the axial pitch of said second set of swirl vanes.

5. The flowmeter of claim 3, wherein the complex planes defined by said first and second sets of swirl vanes are complimentary with respect to one another.

6. The flowmeter of claim 1, further comprising a set of radially extending straightening vanes for removing pre-swirl from the fluid in said passage prior to the fluid flowing through said sets of swirl vanes.

7. The flowmeter of claim 1, wherein said first and second sets of swirl vanes are mutually complimentary.

8. The flowmeter of claim 1, wherein said second set of swirl vanes is rotationally displaceable about an axis defined by said passage.

9. A flowmeter comprising:
a main passage for the flow of a fluid therethrough and defining a central axis;
a plurality of sets of swirl vanes disposed within said main passage and collectively operative to receive at least a portion of said fluid, and swirl said received portion about said central axis for forming a low static pressure region;
means for sensing said low static pressure;
means for sensing the pressure of the fluid before the swirl vanes; and
means operable for selective repositioning of at least one of said sets of swirl vanes with respect to another of said sets of swirl vanes to effect a desired pressure to flow rate operating characteristic for said flowmeter.

10. The flowmeter of claim 9, wherein said main passage has a substantially constant cross-sectional area along said axis.

11. The flowmeter of claim 9, wherein said respositionable set of swirl vanes is rotationally displaceable about said axis with respect to the other of said set of swirl vanes.

12. The flowmeter of claim 9, wherein said sets of swirl vanes are mutually complimentary.

13. A flowmeter comprising:
a main passage for the flow of a fluid therethrough;
means defining a secondary passage disposed within and extending substantially parallel to the direction of flow in said main passage, said secondary passage including a converging inlet for receiving a portion of the fluid flowing in said main passage and an outlet for discharging said portion into the main passage downstream of said inlet;
a plurality of sets of swirl vanes disposed within said main passage and operative to receive at least a portion of the remaining fluid in said main passage and collectively operative to impart a velocity vector thereto at an angle to said main passage flow for creating a reduced pressure region at the outlet of said secondary passage, thereby reducing the static pressure of the fluid in the secondary passage;
means operative to sense the low static pressure within said secondary passage;
means operative to sense the stagnation pressure of the fluid before the swirl vanes;
means operative to sense the difference between said stagnation pressure and said reduced static pressure in said secondary passage; and
means operable for selective repositioning of at least one of said sets of swirl vanes with respect to another of said sets of swirl vanes to effect a desired pressure to flow rate operating characteristic for said flowmeter.

14. The flowmeter of claim 13, further comprising a set of radially extending straightening vanes for removing pre-swirl from the fluid in said main passage prior to the fluid flowing through said swirl vanes.

15. The flowmeter of claim 14, wherein said straightening vanes are integrally formed with one of said sets of swirl vanes.

16. The flowmeter of claim 13, wherein said secondary passage defines a venturi.

17. A flowmeter comprising:
a body defining a main passage for the flow of a fluid therethrough and including a central axis;
a means defining a secondary passage positioned substantially within said main passage, said secondary passage including a converging inlet for receiving a portion of the fluid flowing in said main passage and an outlet for discharging said portion into the main passage downstream of said inlet;
first and second sets of swirl vanes collectively disposed radially intermediate said body and means defining said secondary passage, adjacent the outlet of said secondary passage and at angles oblique to the remaining fluid flowing in said main passage, said sets coacting to impart a velocity vector to said remaining fluid tangential to said axis for creating a reduced pressure area at the outlet of said secondary passage;
means operative to sense the low static pressure within said secondary passage;
means operative to sense the stagnation pressure of the fluid before the swirl means; and
means operable for selective rotational repositioning of said first set of swirl vanes with respect to said second set of swirl vanes about said axis to effect a desired alteration of pressure to flow rate operating characteristics of said flowmeter.

18. The flowmeter of claim 17, wherein said body comprises two concentric cylindric members rotatably interfaced by respective complimentary surfaces operative to prevent axial misalignment between said members while allowing selective rotational repositioning therebetween.

19. The flowmeter of claim 18, wherein said first set of swirl vanes is secured for rotation with one of said members and said second set of swirl vanes is fixed with the other of said members.

20. The flowmeter of claim 19, wherein said means operable for selective rotation repositioning of said sets of swirl vanes comprises clamping means manually operable to prohibit relative rotation of said first and second members.

21. The flowmeter of claim 20, wherein said clamping means comprises at least one screw passing throught a wall of one of said members to selectively engage the other of said members.

22. The flowmeter of claim 17, further comprising a set of radially extending straightening vanes disposed between said body and secondary passage for removing pre-swirl from the fluid in said main passage prior to the fluid flowing through said swirl vanes.

23. The flowmeter of claim 22, wherein said straightening vanes are integrally formed with one of said sets of swirl vanes.

24. The flowmeter of claim 17, wherein said secondary passage defines a venturi.

25. The flowmeter of claim 17, wherein individual vanes of said first set of swirl vanes are substantially identical and have surfaces defining complex planes.

26. The flowmeter of claim 25, wherein individual vanes of said second set of swirl vanes are substantially identical and have surfaces defining complex planes.

27. The flowmeter of claim 26, wherein the axial pitch of said first set of swirl vanes substantially equals the axial pitch of said second set of swirl vanes.

28. The flowmeter of claim 26, wherein the complex planes defined by said first and second sets of swirl vanes are complimentary with respect to one another.

29. The flowmeter of claim 17, wherein both of said sets of swirl vanes terminate at a point axially adjacent said outlet.

* * * * *